(12) United States Patent
Hirano et al.

(10) Patent No.: US 7,525,991 B2
(45) Date of Patent: Apr. 28, 2009

(54) COMMUNICATION TERMINAL DEVICE AND COMMUNICATION CONTROL METHOD

(75) Inventors: Jun Hirano, Yokosuka (JP); Kazunori Inogai, Yokohama (JP); Daichi Imamura, Yokosuka (JP); Takeshi Tanaka, Yokosuka (JP)

(73) Assignee: Panasonic Corporation, Osaka (JP)

( * ) Notice: Subject to any disclaimer, the term of this patent is extended or adjusted under 35 U.S.C. 154(b) by 860 days.

(21) Appl. No.: 10/511,333

(22) PCT Filed: Apr. 18, 2003

(86) PCT No.: PCT/JP03/04965

§ 371 (c)(1),
(2), (4) Date: Oct. 15, 2004

(87) PCT Pub. No.: WO03/088610

PCT Pub. Date: Oct. 23, 2003

(65) Prior Publication Data

US 2005/0180460 A1   Aug. 18, 2005

(30) Foreign Application Priority Data

Apr. 18, 2002   (JP) ............................. 2002-116781

(51) Int. Cl.
*H04J 3/16* (2006.01)
*H04J 3/14* (2006.01)
*H04L 12/42* (2006.01)
*G06F 15/16* (2006.01)

(52) U.S. Cl. ...................... 370/469; 370/235; 370/450; 709/232

(58) Field of Classification Search ......... 370/230–338, 370/465–469, 447–463; 709/223–226, 230–244
See application file for complete search history.

(56) References Cited

U.S. PATENT DOCUMENTS

| 6,108,713 | A  | * | 8/2000 | Sambamurthy et al. | ...... 709/250 |
| 6,560,630 | B1 | * | 5/2003 | Vepa et al. | ................... 718/105 |
| 7,269,151 | B2 | * | 9/2007 | Diener et al. | ............... 370/329 |

(Continued)

FOREIGN PATENT DOCUMENTS

JP    0-5327868   * 12/1993

(Continued)

*Primary Examiner*—Tri H Phan
(74) *Attorney, Agent, or Firm*—Dickinson Wright, PLLC

(57) ABSTRACT

The present invention discloses a communication terminal apparatus, by which it is possible to perform communication while comprehensively controlling a plurality of different communication means. For instance, in a communication terminal apparatus 100 hierarchically classified to a plurality of layers depending on different processing functions such as OSI reference model, it is designed in such manner that a processing unit 303 belonging to a predetermined layer can selectively utilize a plurality of processing units 301 belonging to lower layer through control of an operation control unit 304 belonging to a predetermined layer. For instance, by referring to which processing is available among a plurality of processing units belonging to lower layer, which processing unit has better transmission efficiency in communication, or which processing unit can be used to perform communication with a desired communication partner, data distribution control means 309 controls data distributing means 307, and the data distributing means divides transmission data supplied from upper layer and distributes the data to a plurality of processing units belonging to the lower layer.

14 Claims, 7 Drawing Sheets

U.S. PATENT DOCUMENTS

2002/0035631 A1    3/2002  Chung
2003/0185233 A1*  10/2003  Ji et al. ...................... 370/466

FOREIGN PATENT DOCUMENTS

| JP | 05327868 | | 12/1993 |
| JP | 2000-216815 | * | 8/2000 |
| JP | 2000216815 | | 8/2000 |
| JP | 2001-060956 | | 3/2001 |

* cited by examiner

FIG. 4

| No. | COMMUNICATION SYSTEM | TRANSMISSION | | RECEIVING | |
|---|---|---|---|---|---|
| | | LINK | ROUTE | LINK | ROUTE |
| #1 | HiSWANa | AVAILABLE | ... | AVAILABLE | ... |
| #2 | PHS | UNAVAILABLE | ... | AVAILABLE | ... |
| #3 | IEEE802.11a | AVAILABLE | ... | UNAVAILABLE | ... |
| ... | ... | ... | ... | ... | ... |
| ... | ... | ... | ... | ... | ... |
| #N | | | | | | ical Field

COMMUNICATION TERMINAL DEVICE AND COMMUNICATION CONTROL METHOD

TECHNICAL FIELD

The present invention relates to a communication terminal apparatus, which comprises a plurality of layers hierarchically classified depending on different processing functions such as OSI (Open Systems Interconnections) and having a plurality of communication means of different types. The invention also relates to a communication control method for the communication terminal apparatus.

TECHNICAL FIELD

In the past, it has been practiced in ISDN (Integrated Service Digital Network) or in PHS (Personal Handy-phone System) to provide a plurality of links (multi-links) between communication terminal apparatuses and to perform communication by using these links. Communication terminal apparatuses having a plurality of communication interfaces of different types have been known in the past, and these include: PC (Personal Computer) with various types of communication interfaces at a terminal, and a handy-phone using communication interfaces (both of handy-phone communication interface and PHS communication interface) have been known.

However, in the communication terminal apparatus comprising a plurality of different communication means used in the past, each of these communication means can perform communication independently for each other. But, it is not possible to form multi-links by the communication means of different types and to perform communication while comprehensively controlling the multi-links.

DISCLOSURE OF THE INVENTION

To overcome the above problems, it is an object of the present invention to provide a communication terminal apparatus, comprising a plurality of different communication means, by which it is possible to perform communication while comprehensively controlling a plurality of different communication means by selectively using a plurality of processing units belonging to a lower layer of a predetermined layer. It is also an object of the present invention to provide a communication control method in the communication terminal apparatus.

To attain the above object, according to the present invention, it is designed in such manner that, when a communication terminal apparatus comprising a plurality of layers, hierarchically classified depending on different processing functions, performs operation, an operation control unit belonging to a predetermined layer among a plurality of layers performs communication by selectively using a plurality of processing units belonging to a lower layer of the predetermined layer.

With the arrangement as described above, it is possible to selectively use one or more of a plurality of processing units belonging to the lower layer.

Further, according to the present invention, the operation control unit belonging to the lower layer notifies, to the operation control unit belonging to a predetermined layer, availability information to indicate whether it is possible or not to use a plurality of processing units belonging to the lower layer.

With the arrangement as described above, it is possible to identify whether a plurality of processing units of the lower layer in a predetermined layer is available or not for the communication.

Further, according to the present invention, the operation control unit belonging to a predetermined layer requests notification of availability information to the operation control unit belonging to a lower layer.

With the arrangement as described above, it is possible to identify whether each of a plurality of processing units of a lower layer is available or not at a desired timing in the predetermined layer.

Further, according to the present invention, an operation control unit belonging to a predetermined layer stores the availability information.

With the arrangement as described above, it is possible to refer to the availability information promptly at a desired timing in a predetermined layer.

Further, according to the present invention, when an operation control unit belonging to a predetermined layer receives notification of availability information of an operation control unit belonging to a lower layer, an operation control unit belonging to a predetermined layer refers to the availability information and controls selective utilization of one or more available processing units belonging to the lower layer by the processing unit belonging to the predetermined layer.

With the arrangement as described above, it is possible to select a processing unit definitely available by identifying whether a plurality of processing units of the lower layer is available or not in the predetermined layer.

Further, according to the present invention, an operation control unit belonging to a predetermined layer notifies availability information to an operation control unit belonging to a lower layer of the predetermined layer.

With the arrangement as described above, even in a upper layer of a predetermined layer, it is possible to identify availability information relating to each of a plurality of processing units of the lower layer of the predetermined layer.

Further, according to the present invention, a processing unit belonging to a predetermined layer (data distributing means) divides one data supplied from the processing unit belonging to upper layer and selectively supplies a plurality of data after dividing to a plurality of processing units belonging to the lower layer.

With the arrangement as described above, data are distributed to each of a plurality of processing units of lower layer selectively utilized during data transmission and it is possible to perform communication by using a plurality of processing units.

Further, according to the present invention, an operation control unit belonging to a predetermined layer controls a distribution ratio of a plurality of data after dividing as supplied to one or more available processing units belonging to lower layer by the processing unit of the predetermined layer.

With the arrangement as described above, it is possible to set a distribution ratio of the data to each processing unit depending on communication ability or communication environment of each of the plurality of processing units during data transmission.

Further, according to the present invention, an operation control unit belonging to a lower layer notifies, to an operation control unit belonging to a predetermined layer, availability information to indicate whether it is possible or not to use a plurality of processing units belonging to the lower layer, and if it is available, notifies band information to indicate securable band in the communication using a plurality of processing units belonging to the lower layer and route information to indicate connectible connection target in the communication using each of a plurality of processing units belonging to the lower layer.

With the arrangement as described above, it is possible to identify whether each of a plurality of processing units of the lower layer in a predetermined layer can be used or not during communication and to identify information such as information on band, connection target, etc. in the communication using the available processing unit.

Further, according to the present invention, an operation control unit belonging to a predetermined layer requests, to an operation control unit belonging to a lower layer, a notification of band information and/or route information in addition to the availability information.

With the arrangement as described above, it is possible to identify whether each of a plurality of processing units of lower layer can be used or not at a desired timing in a predetermined layer, and also, to identify information such as information on band or connection target in the communication using the available processing unit.

Further, according to the present invention, an operation control unit belonging to a predetermined layer stores band information and/or route information in addition to the availability information.

With the arrangement as described above, it is possible to refer to the availability information, the band information, or the route information to indicate a connectable partner promptly at a desired timing in a predetermined layer.

Further, according to the present invention, when a notification of availability information is received from an operation control unit belonging to a lower layer, the operation control unit belonging to a predetermined layer refers to band information and/or route information in addition to the availability information and controls selective utilization of one or more available processing units belonging to the lower layer by the processing unit belonging to a predetermined layer.

With the arrangement as described above, it is possible to select a definitely available processing unit while referring to availability information and band information or route information of the available processing unit of a plurality of processing units of the lower layer in the predetermined layer.

Further, according to the present invention, an operation control unit belonging to a predetermined layer notifies band information and/or route information in addition to the availability information to the operation control unit belonging to a upper layer of the predetermined layer.

With the arrangement as described above, even in a upper layer of a predetermined layer, it is possible to identify the availability information relating to each of a plurality of processing units of the lower layer in the predetermined layer and band information and route information of the available processing unit.

Further, according to the present invention, a processing unit belonging to a predetermined layer (data dividing means) divides one data supplied from the processing unit belonging to a upper layer and, after dividing, the processing unit selectively supplies a plurality of data to a plurality of processing units belonging to the lower layer.

With the arrangement as described above, it is possible to distribute the data to each of a plurality of processing units of the lower layer selectively utilized during data transmission and to perform communication by using a plurality of processing units.

Further, according to the present invention, an operation control unit belonging to a predetermined layer refers to band information and/or route information, and the operation control unit controls a distribution ratio of a plurality of data after dividing, which are supplied to one or more available processing units belonging to lower layer by a processing unit of a predetermined layer.

With the arrangement as described above, it is possible, during data transmission, to set a distribution ratio of the data to the processing units, depending on communication ability and communication environment of each of a plurality of processing units and on band and connectable partner.

Further, according to the present invention, a processing unit belonging to a predetermined layer (data unifying means) unifies a plurality of data supplied from a plurality of processing units belonging to lower layer and supplies one data after unification to the processing unit belonging to the upper layer.

With the arrangement as described above, it is possible, during data transmission, to unify a plurality of data, which are supplied from a plurality of processing units of lower layer being selectively utilized to a single data.

Further, according to the present invention, an operation control unit belonging to a predetermined layer controls sequence of a plurality of data after dividing as outputted from a processing unit belonging to a predetermined layer or sequence of a plurality of data from the lower layer unified by the processing unit belonging to the predetermined layer.

With the arrangement as described above, it is possible to unify the data in accordance with a predetermined order during data unification and to turn the data after unification to a desired data.

Further, according to the present invention, a predetermined layer is one or more selected from a data link layer of the layer 2, a network layer of the layer 3, a transport layer of the layer 4, a session layer of the layer 5, or a presentation layer of the layer 6 as defined in the OSI reference model.

With the arrangement as described above, it is possible to apply the present invention in any layer of the OSI reference model.

BRIEF DESCRIPTION OF THE DRAWINGS

FIG. 4 is a table showing an example of operation environment information of a lower layer in the present invention;

BEST MODE FOR CARRYING OUT THE INVENTION

Figure 1:
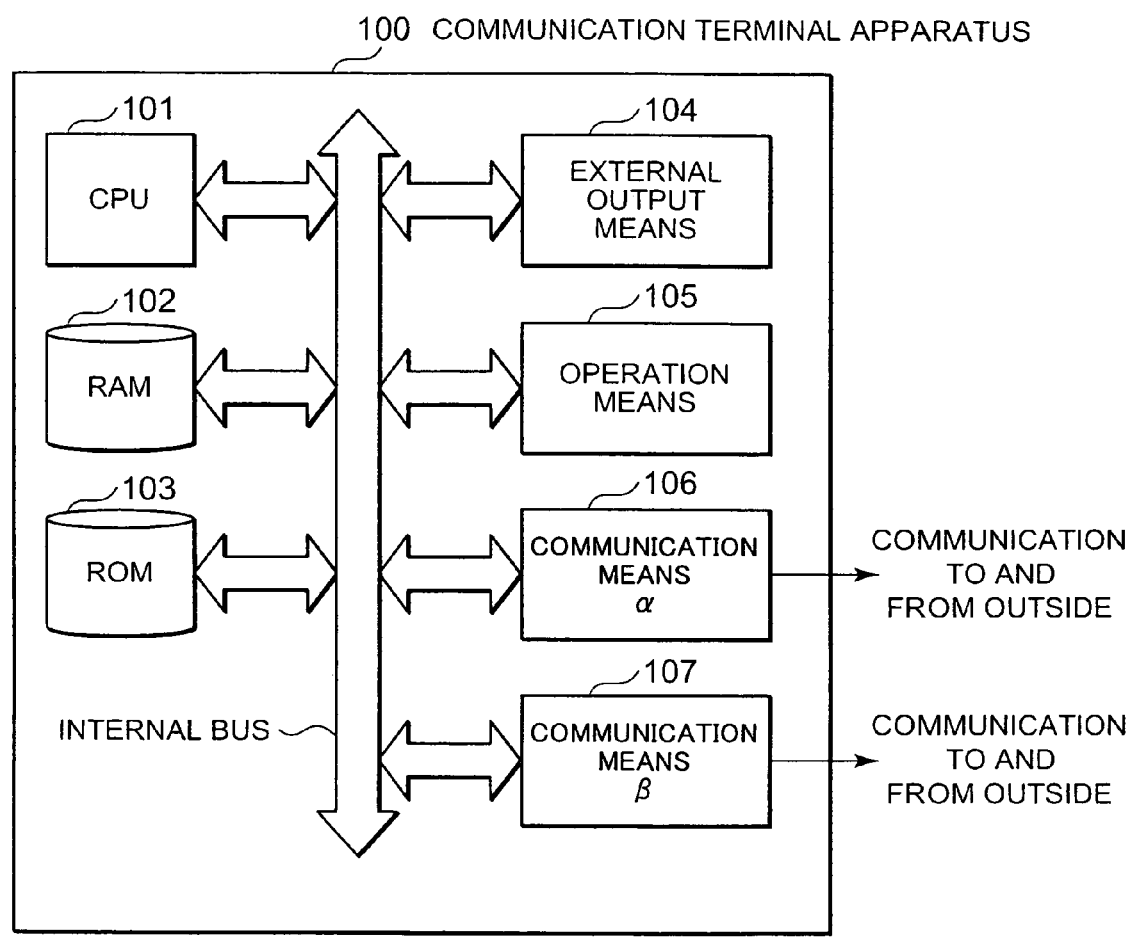
FIG. 1 is a block diagram showing an arrangement of a communication terminal apparatus according to the present invention.

Referring to the drawings, description will be given below on the preferred embodiments of a communication terminal apparatus and also on a communication control method in the communication terminal apparatus according to the present invention.

FIG. 1 is a block diagram showing an arrangement of a communication terminal apparatus of the present invention. A communication terminal apparatus 100 of the present invention comprises a CPU (central processing unit) 101, a RAM (random access memory), a ROM (read only memory) 103, external output means 104, operation means 105, and a plurality of communication means 106.

The CPU 101 is processing means for performing the processing operation of the communication terminal apparatus 100. The RAM 102 is a memory where data can be read and written, and it is storage means for storing various types of information obtained at the communication terminal apparatus 100. The ROM 103 is a memory used for reading only, and it is storage means for storing programs executable by CPU 101. The external output means 104 comprises voice output means such as a loud speaker for outputting voice information or display means such as liquid crystal display or photoelectric display to output image information. The operation means 105 is means in various forms for enabling operation of the communication terminal apparatus 100 by users. For instance, it comprises operation buttons, keyboard, mouse, touch panel type display, etc.

A plurality of communication means 106 as given above are interfaces for performing communication with the other communication terminal apparatus. In FIG. 1, the communication terminal apparatus 100 has two communication means (communication means α and communication means β), while it may have three or more communication means. As the communication means (hereinafter, this may be called "communication system") 106, HiSWANa, PHS, PDC (personal digital cellular telecommunication system), IEEE802.11, ISDN, Bluetooth, etc. may be used. The present invention is not limited to the communication means 106 as given above, and any type of communication means 106 may be used.

The present invention controls the communication performed by a plurality of different communication means 106. The control of communication in the present invention is executed when a program (software) for control stored in ROM 103 or the like is executed by CPU 101. It is also possible to execute the invention by providing a hardware for executing control of the communication of the present invention inside the communication terminal apparatus 100.

Figure 2:
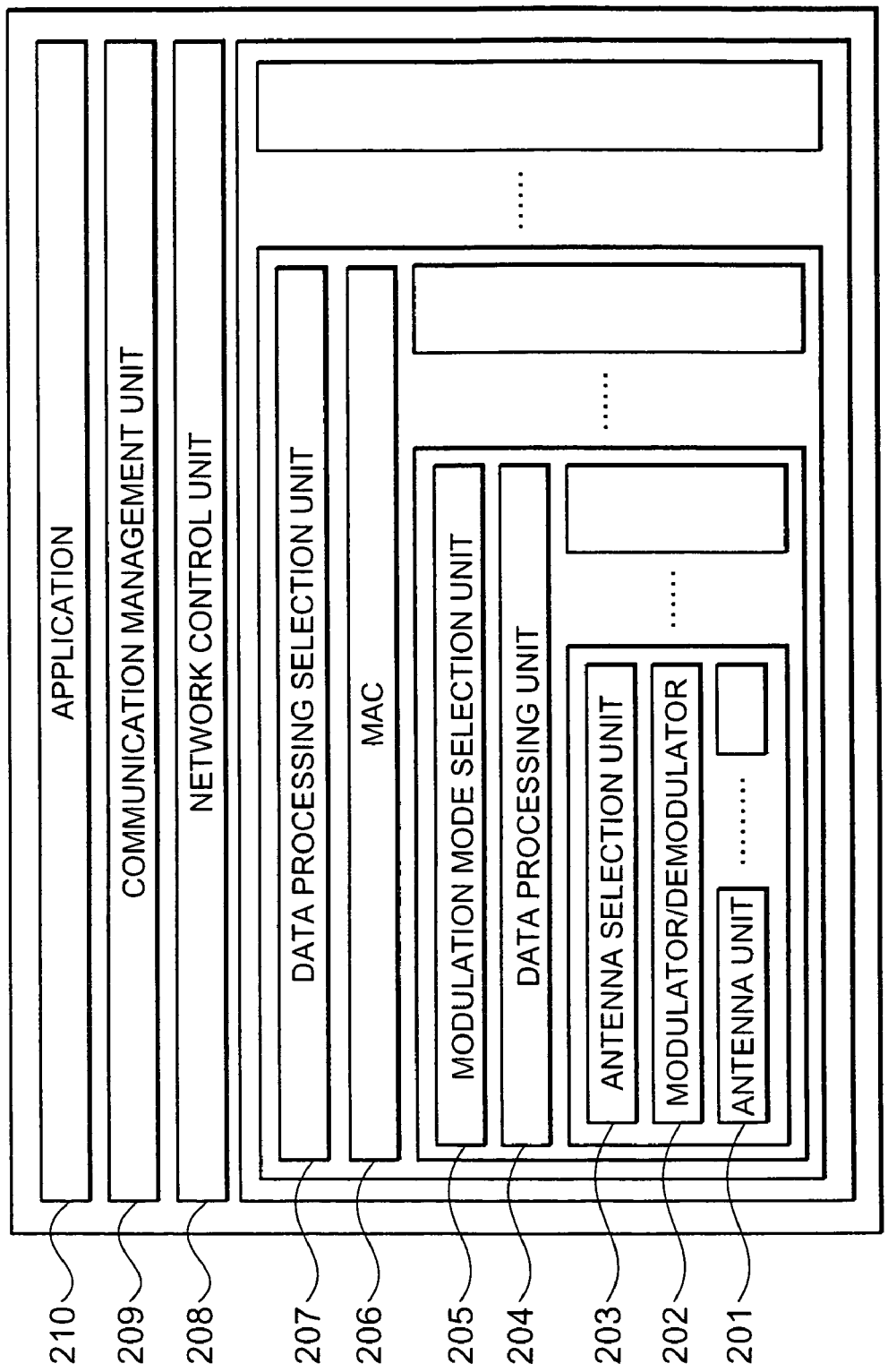
FIG. 2 is a conceptual drawing showing a model, in which communication functions of the communication terminal apparatus of the present invention are divided to hierarchical structures (layer structures)

FIG. 2 is a conceptual drawing of a model, in which communication functions of the communication terminal apparatus of the present invention are divided to hierarchical structures (layer structures). The hierarchical structure as described here is defined and used for convenience, and the present invention is not limited to the hierarchical structure. An antenna unit 201 is an antenna, comprising a single or multiple elements for transmitting and/or receiving data during communication. A modulator/demodulator 202 is a processing unit for performing modulation and/or demodulation to the transmitting/receiving data of a single or a plurality of antennas. There is no special restriction on the mode of modulation or mode of demodulation to be carried out at the modulator/demodulator 202. An antenna selector 203 is an operation control unit for monitoring and controlling the processing at the antenna unit 201 and the modulator/demodulator 202. At the antenna selector 203, selection of antenna to be used or the control of antenna gain is carried out depending on availability/unavailability of the antenna unit 201 or the modulator/demodulator 202 or transmitting/receiving ability of each antenna or on transmitting/receiving ability or status.

A data processing unit 204 is a processing unit for processing transmission data for each mode of modulation to be performed at the modulator/demodulator 202. A modulation mode selecting unit 205 is an operation control unit, which performs monitoring and control of the processing at the data processing unit 204. At the modulation mode selecting unit 205, the control of the data processing unit 204 is performed for the preparation of transmission data to match the selection of modulation mode or to match the selected modulation mode in response to availability/unavailability of the data processing unit 204, band required for data processing, error rate, power required, etc.

A MAC (Media Access Control: medium access control unit) 206 is a processing unit, which defines transmission media used in communication and also defines the type of access control. A data processing selection unit 207 is an operation control unit, which performs the monitoring and the control of processing at the MAC 206. At the data processing selection unit 207, selection instruction and selection control of the transmission media and access control type are carried out in response to availability/unavailability of the MAC 206, the band required for data processing, error rate, and transmission efficiency.

A network control unit 208 is a processing unit for performing processing of transmitting/receiving data so that information to be transmitted accurately can be transmitted and received to and from a partner for communication. A communication management unit 209 is an operation control unit, which performs monitoring and control of processing at the network control unit 208. At the communication management unit 209, selection and selection control of communication system are carried out, guaranteeing that the data is reliably transmitted to the partner or destination in response to the conditions such as availability/unavailability of the network control unit 208 and the communication system, error rate, instruction from the application (user) 210, etc.

Figure 3:
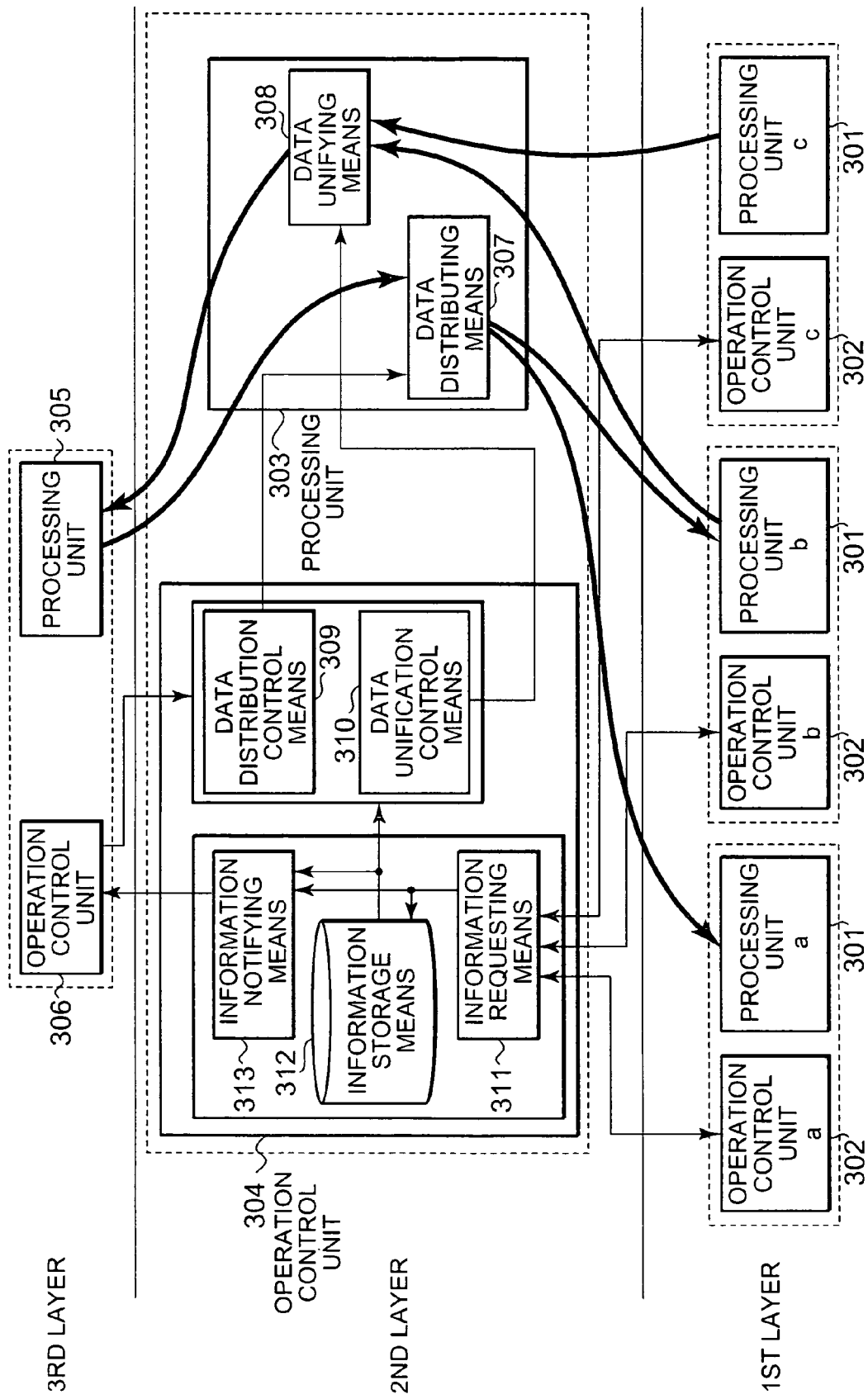
FIG. 3 is a block diagram schematically showing an arrangement at each layer in the communication terminal apparatus of the present invention.

FIG. 3 is a block diagram schematically illustrating an arrangement at each layer of the communication terminal apparatus of the present invention. FIG. 3 shows another aspect of a part of the layer structure shown in FIG. 2. FIG. 3 represents a model, in which communication functions of the communication terminal apparatus 100 of the present invention are divided to hierarchical structures (layer structures). For instance, there is a protocol hierarchy called an OSI (Open Systems Interconnection) reference model as defined in ISO (Internal Organization for Standardization), while it is also possible to apply the present invention to other model having hierarchical structure.

In FIG. 3, a first layer, a second layer, and a third layer are shown. The first layer is a lower layer of the second layer, and the third layer is a upper layer of the second layer. Each layer comprises one or more processing units (U-Plane: user plane) for carrying out processing relating to communication function as defined in the layer and an operation control unit (C-Plane: control plane) for controlling operation of each processing unit.

To facilitate the explanation, FIG. 3 represents aspects where the first layer comprises three processing units 301 and three operation control units 302 for controlling operation of each of the processing units. The second layer comprises a processing unit 303 and an operation control unit 304 for controlling operation of the processing unit 303, and the third layer comprises a processing unit 305 and an operation control unit 306 for controlling operation of the processing unit 305, while the present invention is not limited to such arrangement. Also, FIG. 3 shows aspects where there are provided, in the first layer, three operation control units 302 to match each of the three processing units 301, while it is also possible to design in such manner that operation of a plurality of processing units 301 is controlled by a single operation control unit 302. In order to discriminate the layers from each other, these are called as the first to the third layers, but the notation of the first to the third layers does not indicate the first layer to the third layer of an OSI standard model.

The processing unit 303 of the second layer comprises data distributing means 307 and data unifying means 308. The data distributing means 307 distributes a supplied data and outputs a plurality of data. The data unifying means 308 unifies a plurality of supplied data and outputs a single data. The data unifying means 308 also performs sequence control when a plurality of data are unified to a single data. In addition to the function to distribute and unify the data, it is possible to design that the data distributing means 307 and the data unifying means 308 can have functions to perform various types of data processing.

The operation control unit 304 of the second layer comprises data distribution control means 309, data unification control means 310, information requesting means 311, information storage means 312, and information notifying means 313. The data distribution control means 309 is the means for outputting a distribution control signal to the data distributing means 307. The distribution control signal controls destination of a plurality of data to be distributed and outputted by the data distributing means 307 and data distribution ratio (data band to be outputted to each destination) to a plurality of destination. Specifically, the data distribution control means 309 outputs a control signal to the data distributing means 307. The control signal instructs as to which processing unit 301 among a plurality of processing units 301 existing in the lower layer the data amount should be outputted and how much the data amount should be. Also, the data unification control means 310 is the means for outputting a unification control signal to the data unifying means 308. The unification control signal controls unification timing of the data by the data unifying means 308 or output timing of the unified data. The data distribution control means 309 and the data unification control means 310 output a distribution control signal and a unification control signal respectively based on the instruction from the operation control unit 306 of the upper layer or on information acquired by the information requesting means 311.

The information requesting means 311 is the means for requesting availability information to the operation control unit 302 of lower layer (the first layer). The availability information provides information as to whether it is possible or not to utilize the processing unit of 301 of lower layer, band information for indicating a securable band by communication using the processing unit 301 of lower layer, or route information indicating connectable destination by communication using the processing unit of lower layer (these types of information are hereinafter called as "operation environment information of lower layer"). It is also the means for acquiring operation environment information of lower layer from the operation control unit 302 of the lower layer. In particular, under the condition where the state of availability/unavailability of the processing unit 301 of the lower layer is frequently changed, it is important to request operation environment information to the lower layer.

The information storage means 312 is the means for storing the operation environment information of lower layer acquired by the information requesting means 311. The information notifying means 313 is the means for acquiring operation environment information of lower layer stored in the information storage means 312 and for outputting operation environment information of lower layer to the operation control unit 306 of upper layer (the third layer).

Next, description will be given on operation in the arrangement shown in FIG. 3. The information requesting means 311 requests operation environment information of the lower layer to each of the operation control units 302 (i.e. operation control units a, b and c) of the lower layer (the first layer) and acquires operation environment information of the lower layer from each of the operation control units a, b and c. The operation environment information of the lower layer thus obtained is sent to the information storage means 312 and is stored.

FIG. 4 is a table for schematically showing an example of the operation environment information of the lower layer according to the present invention. As shown in FIG. 4, each processing unit 301 is associated with the availability information relating to each processing unit 301, and with the band information, the route information, etc.

The data distribution control means 309 and the data unification control means 310 can identify the operation unit 301 under available condition among the operation units 301 of the lower layer by referring to the availability information of the operation environment information read out from the information storage means 312 (or operation environment information supplied from the information requesting means).

[In Case Data is Transmitted]

First, description will be given on a case where data is transmitted by using the communication terminal apparatus 100. It is important for data distribution by the data distributing means 307 to identify the operation unit 301 of the lower layer under available condition. Specifically, in case where there is one operation unit 301 under available condition, the data distribution control means 309 controls so that the data distributing means 307 outputs the data only to the available operation unit 301. In case where there are two or more operation units 301 under available condition, the given condition is judged. By selecting one of a plurality of operation units 301 under available condition or a combination of these, it is controlled in such manner that the data distributing means 307 outputs the data at a given distribution ratio to the selected operation unit 301.

Now, description will be given on the predetermined condition used as criteria for selection when the operation unit 301 under available condition is selected. As the predetermined condition, band information at each operation unit 301 is used. The data distribution control means 309 selectively utilizes the operation unit 301 of lower layer so that a given band can be obtained for communication. For instance, in case the desired band necessary for data transmission is W for the entire communication terminal apparatus 100, the band acquired when the operation unit "a" of lower layer is used is $\alpha$ (<W), and in case the band acquired when the operation unit "b" of lower layer is $\beta$ (<W), and the band $\alpha$+ the band $\beta$ (>W), it is possible to secure the band W required entirely by using both of the operation units "a" and "b" of the lower layer. In this case, therefore, the data distribution control means 309 utilizes both of the operation units "a" and "b" of the lower layer, and data is transmitted by distributing the data to the operation units "a" and "b". FIG. 3 shows how the data are distributed to the operation units "a" and "b". The data distribution control means 309 can set the distribution ratio of the data to these operation units "a" and "b" at any value as desired.

It is also possible to cite route information at each operation unit 301 as the predetermined condition. The data distribution control means 309 refers to the route information and selectively utilizes the operation unit 301 of the lower layer so that the data can be transmitted to the connection target as desired. For instance, in the communication using the operation units "a" and "c" of the lower layer, the data can be transmitted to the connection target as desired (i.e. the desired connection target is included in the route information of transmission destination). In the communication using the operation unit "b" of the lower layer, the data cannot be transmitted to the desired connection target (i.e. the desired connection target is not included in the route information of transmission destination), and the data distribution control means 309 utilizes one or both of the operation units "a" and "c" of the lower layer. Data are distributed to these operation units "a" and "c" and are transmitted. In this case, also, it is possible to set the data distribution ratio to the operation units "a" and "b" at any value as desired.

In particular, it is also possible to select one or more of the operation units 301, which is under available condition, without setting a predetermined condition. Specifically, it is possible to select one or more from the operation units 301 under available condition at random and to utilize all of them. Also, it is possible to set the distribution ratio of data at random.

The referring of the predetermined condition and the selection of the operation unit 301 of the lower layer by the data distribution control means 309 can be carried out in accordance with the instruction of the operation control unit 306 of the upper layer (or with the setting by the user). Specifically, in case an instruction is given from the operation control unit 306 of upper layer to the data distribution control means 309 to refer to the band information or to the route information (or to both), the data distribution control means 309 selects the operation unit 301 in accordance with this instruction. When information relating to the desired band or the desired connection target is supplied from the operation control unit 306 of the upper layer to the data distribution control means 309, the operation unit 301 suitable for such condition is selected.

As described above, the data distribution control means 309 can refer to the operation environment information (such as availability information, band information, route information, etc.), and controls the data distributing means 307. The data distributing means 307 can divide the data supplied from the upper layer and can selectively distribute these divided data to one or more operation units 301 of the lower layer.

As described above, it is possible to selectively use the operation unit 301 by the data distribution control means 309, while it is also possible to select the operation unit 301 used by the operation control unit 306 (or the user) of upper layer. That is, the operation environment information (such as availability information, band information, route information, etc.) of the lower layer is supplied from the information notifying means 313 to the operation control unit 306 of the upper layer. The operation control unit 306 of the upper layer (or the user) refers to this operation environment information and selects one or more operation units 301 of the lower layer to be used. The information such as the operation unit 301 of the lower layer to be used or data distribution ratio is supplied from the operation control unit 306 of the upper layer to the data distribution control means 309. In accordance with the instruction from the upper layer, the data distribution control means 309 controls data distribution to the operation units 301 of the lower layer.

As described above, the information notifying means 313 notifies the operation environment information (such as availability information, band information, route information, etc.) to the operation control unit 306 of the upper layer, and it is possible to perform control of data distribution by the data distributing means 307 so that the data distribution control means 309 utilizes the operation unit 301 of the lower layer selected by the upper layer (or the user).

[In Case Data is Received]

Next, description will be given on a case where data is received by using the communication terminal apparatus 100 as described above. Similarly to the case where the data is transmitted as described above, the data unification control means 310 selects an available lower layer (the first layer) and controls in such manner that the data unifying means 308 receives the data processed by the selected processing unit 301 and performs processing of the data. Specifically, the data unifying means 308 receives the data from one or more operation units 301 under available condition, and it controls in such manner that the received data are unified and outputted.

In case the communication terminal apparatus 100 receives the data from the other communication terminal apparatus via a plurality of communication means 106, the data received by each of a plurality of communication means 106 is processed by a plurality of processing units 301 of the lower layer (the first layer) corresponding to each of the plurality of communication means 106. Then, these data are supplied to the data unifying means 308 of the second layer. In accordance with the control of the data unification control means 310, the data unifying means 308 receives the data from the plurality of processing units 301 of the lower layer. Data processing such as sequence control is performed, and the unified data are outputted to the processing unit 305 of the upper layer (the third layer). Even when the data with different formats are received from each of the plurality of processing units 301 of the lower layer, processing is performed to have a single format, and the data after processing are outputted to the processing unit 305 of the upper layer. Specifically, until these data are processed by the data unifying means 308 of the second layer, it is not known that the data outputted to the processing unit 305 of the upper layer (the third layer) is the divided data and that the data are the data outputted from each of a plurality of processing units 301 of the first layer.

As described above, the data unification control means 310 can control the data unifying means 308 by referring to the operation environment information (such as availability information, band information, route information, etc.), and the data unifying means 308 can unify a plurality of data supplied from a plurality of processing units 301 of the lower layer and can output these data to the operation units of upper layer. FIG. 3 shows how the data from the operation units "b" and "c" are unified in this manner.

Figure 5:
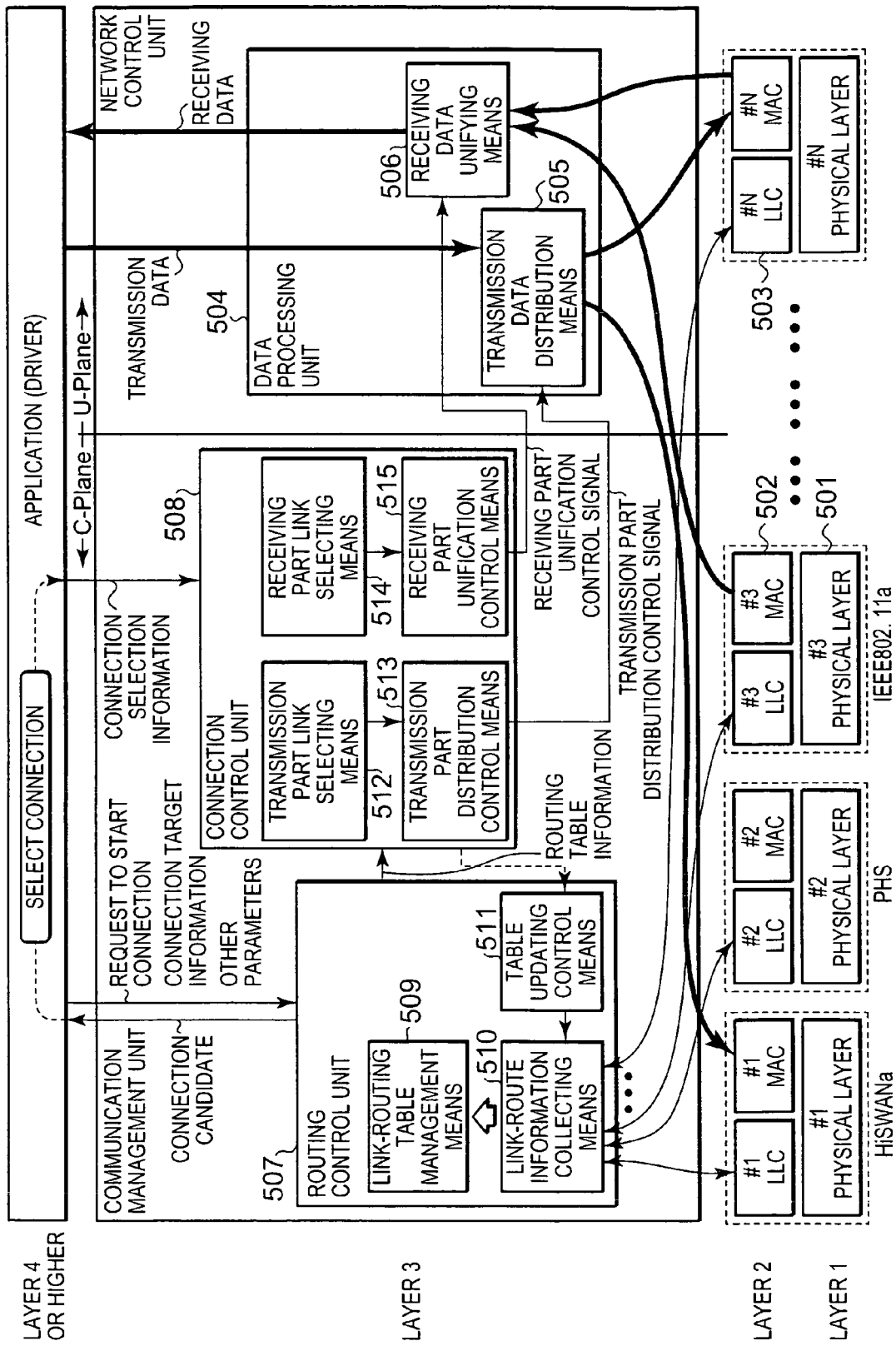
FIG. 5 is a block diagram schematically showing an arrangement at each layer of an OSI reference model of the communication terminal apparatus of the present invention.

Next, description will be given on a case where the layer 3 of the OSI reference model is applied as the second layer in the above embodiment. FIG. 5 is a block diagram schematically showing the arrangement of each layer of the OSI reference model according to the communication terminal apparatus of the present invention.

The layer 1 is generally called a physical layer, and it is a layer to define electrical and physical requirements corresponding to the level of hardware. A layer 2 is generally called a data link layer, and it is a layer to define the requirements for forming a logical network between the communication terminal apparatuses where connection is physically established. A layer 3 is a layer to define the requirements to establish interconnection between the communication terminal apparatuses by selecting adequate pathways in case where a relay network is present between the communication terminal apparatuses. A layer 4 and each of higher layers is generally called a transport layer (layer 4), a session layer (layer 5), a presentation layer (layer 6), and an application layer (layer 7). These are the layers to define the requirements such as data processing to establish connection of application between the communication terminal apparatuses or to make the data usable in the application.

The layer 2 comprises a MAC (Media Access Control; media access control unit) 502 to correspond to a transmission media (media) of the layer 1, and an LLC (Logical Link Control; logical link control unit) 503. The MAC 502 defines access control mode to transmission media. The LLC 503 monitors access control mode by the MAC 502 and converts the data to the format usable at the upper layer. In FIG. 5, there are "N" physical layers (#1 physical layer to #N physical layer) 501. Further, it is shown that there are MACs 502 (#1 MAC to #N MAC) and LLCs 503 (#1 LLC to #N LLC) to each of the physical layers 501.

The layer 3 is roughly divided to a network control unit, serving as U-Plane (user plane), and a communication control unit, serving as C-Plane (control plane).

The network control unit comprises a data processing unit 504, which consists of transmission data distributing means 505 and receiving data unifying means 506. The transmission data distributing means 505 is the means to distribute transmission data strings supplied from the upper layer to the designated one or more MACs 502 according to the designated band in accordance with a transmission part distribution control signal (parameter for specifying connection target MAC or band) supplied from transmission part distribution control means 513 (to be described later). For instance, the transmission data distributing means 505 turns information string supplied from the layer 4 or higher (upper layer) to IP packet (turning to PDU), and it is allotted to have a given distribution ratio and is outputted to a plurality of MACs 502 of the layer 2.

The receiving data unifying means 506 is the means for unifying the received data strings supplied from a plurality of MACs 502 in accordance with a receiving part unification control signal (parameter for specifying connection target MAC or band) supplied from the receiving part unification control means 515 (to be described later) and for outputting it to the upper layer. For instance, information sequence is supplied at a given rate from a plurality of MACs 502 to the layer 2, and the receiving data unifying means 506 unifies IP packet to data string of the upper layer according to the amount of information supplied and this is outputted.

The communication management unit comprises a routing control unit 507 and a connection control unit 508. The communication management unit performs management for effectiveness/ineffectiveness of the link. It places a plurality of existing communication systems under management and control by the routing control.

The routing control unit 507 comprises link-routing table management means 509, link-route information collecting means 510, and table updating control means 511.

The link-routing management means 509 is the means for preparing a link table and a routing table based on the information acquired from the link-route information collecting means 510 and for outputting a request to update the link-route information with respect to the table updating control means 511. Also, connection target information and "available connection candidate" to satisfy other parameters (such as requested band) from the upper layer are reported to the upper layer.

The link-route information collecting means 510 is the means for giving and taking information to and from LLC 503 of the lower layer, for collecting availability information as to whether each link of a plurality of existing lower layers is available or not, and for collecting route information up to the connection target if the link is available.

The table updating control means 511 is the means for requesting collection of availability information of the link of the lower layer to the link-route information collecting means 510. In particular, in a communication system where transmission route environment varies from time to time, the table updating control means 511 performs the control necessary for updating the link table information to follow the change over time independently or at the request of the link-routing table management means 509.

The connection control unit 508 comprises transmission part link selecting means 512, transmission part distribution control means 513, receiving part link selecting means 514, and receiving part unification control means 515. The connection control unit 508 controls connection target of the data to be transmitted and received to the layer 2 by using connection selecting information instructed from the upper layer (such as application) and routing table information.

The transmission part link selecting means 512 is the means for determining MAC 502 of the lower layer used for data transmission based on the connection selecting information and the routing table information so that data can be transmitted to the connection target as desired. The transmission part distribution control means 513 is the means for outputting, to the transmission data distributing means 505, a transmission part distribution control signal to instruct distribution control when the transmission data distributing means 505 distributes the data to one or more MACs 502 as determined by the transmission part link selecting means 512.

The receiving part link selecting means 514 is the means for determining MAC of lower layer to be used for data receiving based on the connection selecting information and the routing table information. Also, the receiving part unification control means 515 is the means for outputting a receiving part unification control signal to instruct the unification control when the receiving data unifying means 506 unifies the data received at one or more MACs 502 determined by the receiving part link selecting means 514.

[In Case Data is Transmitted]

Next, description will be given on operation of data transmission in the arrangement shown in FIG. 5. First, the link-route information collecting means 510 receives a report as to whether MAC 502 is available or not from LLC 503 of the layer 2 and supplies the reported information (availability information) to the link-routing management means 509. The link-route information collecting means 510 acquires band information showing how many bands can be secured or connection target information (routing information) indicating connectable connection target (routing information) with respect to the available MAC 502 and supplies the information to the link-routing table management means 509.

The link-routing table management means 509 prepares link table information to indicate availability information of MAC 502 shown in FIG. 4 or routing table information to indicate connectable connection target based on each MAC. When a link-route updating request is outputted to the table updating control means 511, the link-routing table management means 509 regularly updates the link table information and the routing table information. This is done when the table updating control means 511 asks the link-route information collecting means 510 to collect information from the layer 2.

The routing control unit 507 receives connection target request information to indicate which connection target should be connected or band request information to indicate how many bands are required. Then, a list of links or a combination of links to satisfy the connection of these sets of request information (connection candidate) is notified to the upper layer. Based on this information, the upper layer (user or application) selects one or more MACs 502 to be used for communication, and this is notified to the connection control unit 508 as connection selecting information.

The transmission part link selecting means 512 of the connection control unit 508 refers to the connection selecting information from the upper layer and the routing table information from the routing control unit 507, and one or more MACs 502 to be used are notified to the transmission part distribution control means 513. The transmission part distribution control means 513 refers to information such as band information of MAC 502 selectively used and determines data distribution ratio to each MAC 502. The transmission distribution control means 513 outputs the data distribution ratio to MAC 502, to which the transmission data distributing means 505 is outputted, and also outputs data distribution ratio to each MAC 502 as a transmission part distribution control signal. At the same time, the connection control unit 508 transmits a connection request to initiate connection to LLC 503 so that data transmitting operation as desired can be carried out by a given MAC 502.

By the control using the transmission part distribution control signal, the transmission data distributing means 505 turns the transmission data supplied from the upper layer to IP packet, and this is distributed to a predetermined MAC 502 at a given distribution ratio (e.g. data are distributed at a ratio of 1:3 to #1 MAC and #N MAC). In this case, it is also possible to perform sequence control of the transmission data to be outputted by distributing different MACs 502. For instance, it is possible to design that sequence control is performed at the upper layer such as transport layer of the layer 4. By the MAC receiving the distributed transmission data (i.e. #1 MAC and #N MAC) and by the physical layer 501 of the corresponding layer 1, a predetermined processing is performed, and the data are transmitted to other communication terminal apparatus or to an external network from the communication terminal apparatus 100.

[In Case Data is Received]

Next, description will be given on operation of data receiving in the arrangement shown in FIG. 5. The upper layer (user or application) selects one or more MACs 502 to be used for data receiving and outputs it to the connection control unit 508 as connection selecting information. The receiving part link selecting means 514 of the connection control unit 508 refers to the connection selecting information and the routing table information and notifies one or more MACs 502 to be used to the receiving part unification control means 515.

The connection control unit 508 transmits a connection initiating request to LLC 503 via the routing control unit 507 so that the data receiving operation as desired can be performed by a given MAC 502. It is also possible to design in such manner that the information relating to the communication means 106 used during data receiving (information is notified to indicate which communication means 106 can be used) to the communication terminal apparatus, which transmits the data.

When data is received from the other communication terminal apparatus via a plurality of communication means 106, data receiving processing is carried out by a physical layer 501 corresponding to the plurality of communication means 106 and by the MAC 502 of the layer 2. LLC 503 notifies to the connection control unit 508 that the receiving data addressed to it has been processed at a predetermined MAC 502. Based on this notification and on the information relating to one or more MAC 502 to be used during data receiving as notified from the receiving part link selecting means 514, the receiving part unification control means 515 of the connection control unit 508 judges that the receiving data processed by the predetermined MAC 502 is a data relating to the data receiving specified by the connection selecting information from the upper layer. Then, a receiving part unification control signal for controlling the processing of the receiving data unifying means 506 is outputted to the receiving data unifying means 506.

Through the control by the receiving part unification control signal, the receiving data unifying means 506 unifies the receiving data (turned to packet) as supplied at a given ratio from a plurality of MACs 502 of the layer 2 (e.g. data are supplied at a ratio of 1:3 from #3 MAC and #N MAC), and the unified data string is outputted to the upper layer. In this case, it is also possible to perform sequence control of the receiving data supplied from different MACs 502. For instance, it is also possible to design in such manner that sequence control is performed at the upper layer such as the transport layer of the layer 4.

Figure 6:
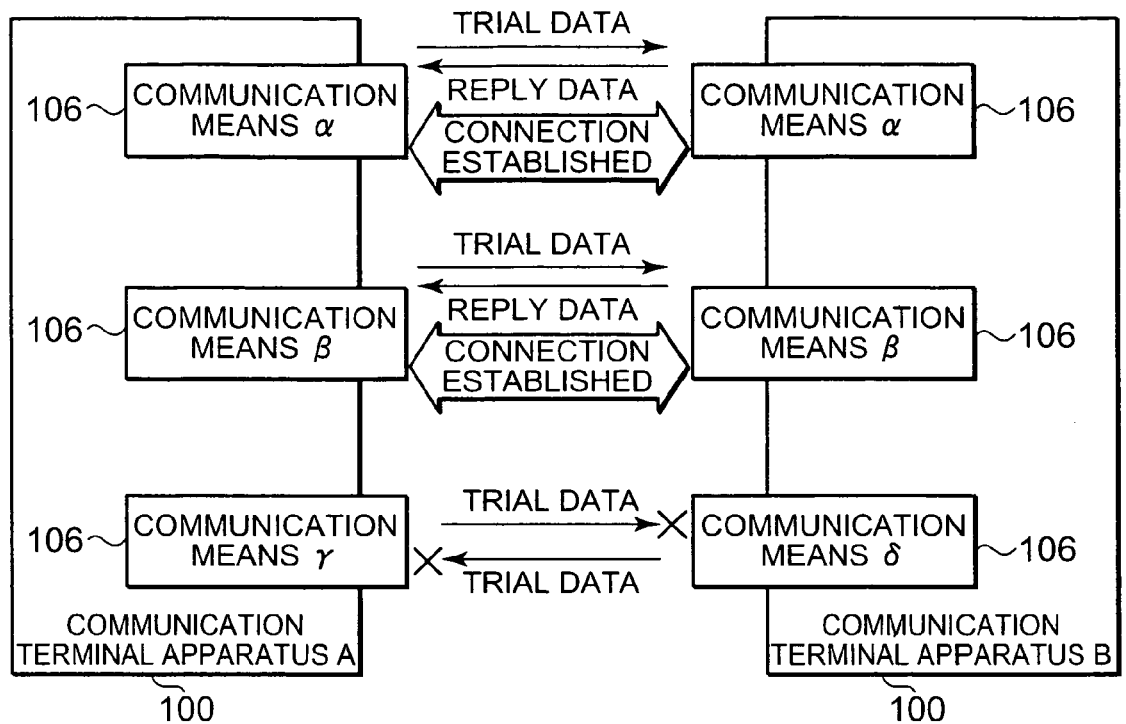
FIG. 6 is a schematical block diagram showing a first example of communication between communication terminal apparatuses A and B of the present invention.

Next, description will be given on an embodiment when communication is performed by using the communication terminal apparatus 100 of the present invention. FIG. 6 is a schematical diagram showing a first example of communication between the communication terminal apparatuses A and B. The communication terminal apparatus A shown in FIG. 6 (the communication terminal apparatus 100 of the present invention) comprises three communication means 106 consisting of communication means α, β and γ. The communication terminal apparatus B (the communication terminal apparatus 100 of the present invention) comprises three communication means 106, consisting of communication means α, β and δ. It is supposed that all of these communication means 106 can be operated. The suffixes α, β, γ, and δ attached to the communication means 106 are used to discriminate the types of the communication means 106. Here, it is assumed that different suffixes are attached to different types of communication means 106, and the communication means 106 with the same suffix can perform communication with each other.

When a communication terminal apparatus A and a communication terminal apparatus B perform communication between them, it is necessary to determine whether it is possible to establish connection between them in the preliminary stage of communication. For instance, the communication means 106 of the communication terminal apparatuses A and B can establish connection between them by confirming the connection (investigation of communication environment).

For instance, the communication means α of the communication terminal apparatus A sends a trial data such as echo request to external communication environment at every given period or in response to an instruction from the upper layer. When the trial data sent from the communication means α of the communication terminal apparatus A is received by the communication means α of the communication terminal apparatus B, the communication means α of the communication terminal apparatus B transmits a reply data such as echo relay, serving as a reply to the trial data, to the communication means α of the communication terminal apparatus A. As a result, the communication means α of the communication terminal apparatus A and the communication means α of the communication terminal apparatus B can recognize mutual presence. By exchanging information required for subsequent communication such as mutual address, it is possible to establish mutual connection.

On the other hand, the communication means γ of the communication terminal apparatus A also sends a trial data to external communication environment at every given period or in response to the instruction of the upper layer. However, when this trial data reaches the communication terminal apparatus B, it is not possible to send reply to the trial data from the communication terminal apparatus A because the communication terminal apparatus B does not have the communication means γ, and it is certain that communication with the communication terminal apparatus B cannot be achieved by the communication means γ. Thus, when the communication terminal apparatus A performs communication with the communication terminal apparatus B subsequently, the communication terminal apparatus A cannot perform communication with the communication terminal apparatus B by using this communication means γ.

As described above, in the preliminary stage of communication, the communication terminal apparatuses A and B confirm whether it is possible to establish connection with each other, and the link table information at each of the apparatus is updated. In the example of FIG. 6, the information of the communication terminal apparatus B is written in the link table information relating to the communication means α and β of the communication terminal apparatus A, and the information of the communication terminal apparatus A is written in the link table information relating to the communication means α and β of the communication terminal apparatus B. As a result, the communication terminal apparatuses A and B can automatically recognize the communication means 106 available for communication. By selecting the communication means α and β, it is possible to perform communication with each other by using the communication means α and β on both sides.

Although the communication terminal apparatuses A and B can perform communication by using both of the communication means α and β, it is also possible that communication is carried out by selectively utilizing either one of the communication means 106 (either one of the communication means α or the communication means β) by referring to various types of information such as band and communication speed, stability of communication and security protection. Also, it is possible to use the communication means α for data transmission from the communication terminal apparatus A to the communication terminal apparatus B, and to use the communication means β for data transmission from the communication terminal apparatus B to the communication terminal apparatus A, i.e. to use adequate communication means 106 depending on the difference of direction of data transmission.

Figure 7:
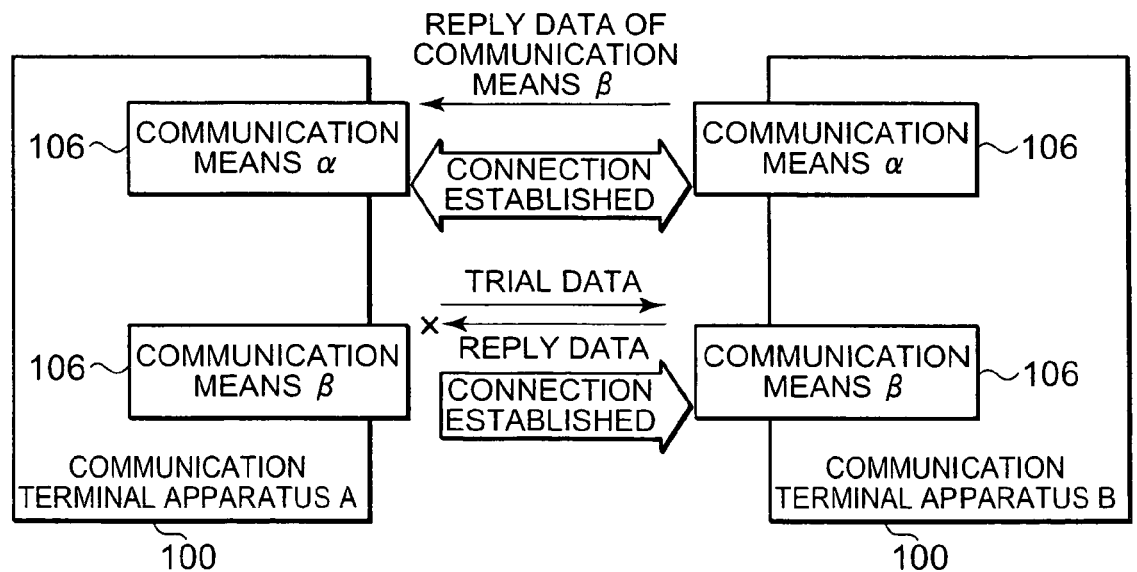
FIG. 7 is a schematical block diagram showing a second example of communication between communication terminal apparatuses A and B of the present invention.

FIG. 7 is a schematical block diagram showing a second example of the communication between the communication terminal apparatuses A and B of the present invention. Each of the communication terminal apparatuses A and B shown in FIG. 7 has two communication means 106, i.e. the communication means α and β, and it is supposed that these two communication means 106 can be operated.

For instance, it is assumed that connection is established between the communication means α of the communication terminal apparatus A and the communication means α of the communication terminal apparatus B based on the method as explained in connection with FIG. 6. On the other hand, it is assumed that the communication means β of the communication terminal apparatus A and the communication means β of the communication terminal apparatus B are in the following conditions: Due to various reasons such as difference of communication environment and communication power (difference of communication cell range), or trouble in the communication terminal apparatus 100, the communication means β of the communication terminal apparatus B can receive and confirm trial data sent from the communication means β of the communication terminal apparatus A, but the communication means β of the communication terminal apparatus A cannot receive or confirm reply data from the communication terminal apparatus B.

In this case, the communication terminal apparatus B can send the reply data relating to the communication means β to the communication terminal apparatus A by using the communication means α. The communication means α of the communication terminal apparatus A receives the reply data relating to the communication means β from the communication terminal apparatus B, and the reply data is sent to the upper layer. Based on the reply data, the operation control unit of the upper layer notifies, to the operation control unit of the lower layer, that the communication means β can be used when data is transmitted to the communication terminal apparatus B as connection target information, and the link table information is updated. As a result, when the communication terminal apparatuses A and B perform communication with each other, the communication terminal apparatus A transmits data to the communication terminal apparatus B by using the communication means 106 (i.e. both of the communication means α and β), while the communication terminal apparatus B can transmit the data to the communication terminal apparatus A by using only the communication means α.

Figure 8:
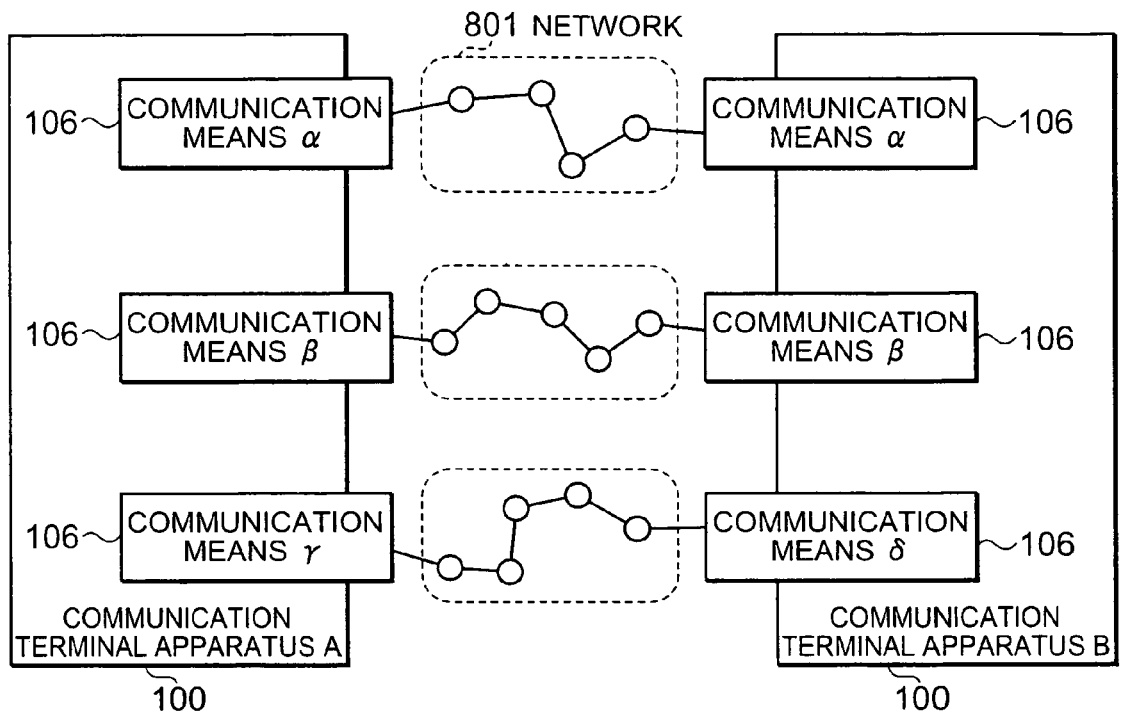
FIG. 8 is a schematical block diagram showing a third example of communication between communication terminal apparatuses A and B of the present invention.

FIG. 8 is a schematical block diagram showing a third example of the communication between the communication terminal apparatuses A and B of the present invention. Each of the communication terminal apparatuses A and B as shown in FIG. 8 has three communication means 106, i.e. communication means α, β and γ. It is supposed that all of these three communication means 106 can be operated.

In FIG. 6 and FIG. 7, description has been given on the case where the communication terminal apparatuses A and B directly perform communication with each other. However, it is also possible that the communication terminal apparatus 100 performs communication via a network 801 (the existing network or ad hoc network). Each of the communication means 106 can perform communication by using the same network 801, or communication can be carried out by using different types of network 801. When connection is made to the connection target as desired via the network 801, connection can be made with the connection target via a network 801 determined in advance, or the connection target and the route may be searched by using a routing mode such as DSR (Dynamic Source Routing), to establish the connection.

Figure 9:
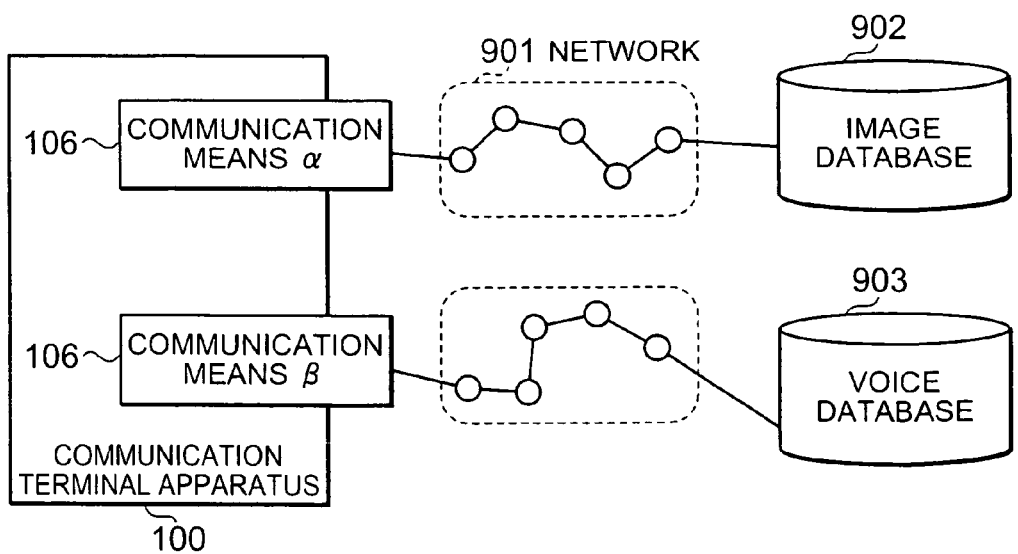
FIG. 9 is a schematical block diagram of an example of communication using the communication terminal apparatus of the present invention.

FIG. 9 is a schematical block diagram showing an example of communication using the communication terminal apparatus of the present invention. The communication terminal apparatus 100 of FIG. 9 comprises two communication means 106 (i.e. the communication means α and β). It is supposed that these two communication means 106 can be in operation.

As shown in FIG. 9, the communication terminal apparatus 100 can also perform communication with different communication partners (different databases in FIG. 9) via a network 901 by using the communication means α and β. For instance, the communication means α can receive an image data from an image database 902 by connecting with the image database 902, and the communication means β can receive a voice data from a voice database 903 by making connection with the voice database 903. When the image data and the voice data are unified by data unifying means 308 (receiving data unifying means 506), it is possible to acquire contents of both image and voice. In the data unification, it is possible to synchronize the data received by different types of communication means 106 (image data and voice data in this case) by any method as desired.

INDUSTRIAL APPLICABILITY

As described above, according to the present invention, when communication terminal apparatuses, each of which comprises a plurality of layers classified hierarchically depending on different processing functions, perform communication, an operation control unit belonging to a predetermined layer among a plurality of layers performs communication by selectively utilizing a plurality of processing units belonging to lower layer among the predetermined layer. As a result, in a predetermined layer of the communication terminal apparatus having a plurality of different types of communication means, a plurality of processing units belonging to lower layer among the predetermined layers can be selectively utilized. This makes it possible to perform communication while comprehensibly controlling a plurality of different types of communication means.

What is claimed is:

1. A communication terminal apparatus, comprising a plurality of layers hierarchically classified depending on different processing functions, said apparatus comprising:
   a processing unit belonging to a predetermined layer;
   a plurality of processing units belonging to a lower layer than said predetermined layer;
   a processing unit belonging to an upper layer than said predetermined layer;
   an operation control unit for controlling operation of said processing unit belonging to said predetermined layer, said operation control unit belonging to said predetermined layer;
   an operation control unit for controlling operation of said processing unit belonging to said lower layer, said operation control unit belonging to said lower layer; and
   an operation control unit for controlling operation of said processing unit belonging to said upper layer, said operation control unit belonging to said upper layer,
   wherein said processing unit belonging to said predetermined layer comprises a data distributor for distributing one supplied data and for outputting a plurality of data,
   wherein said processing unit belonging to said predetermined layer can selectively use said plurality of processing units belonging to said lower layer through control of said operation control unit belonging to said predetermined layer,
   wherein said operation control unit belonging to said lower layer notifies, to said operation control unit belonging to said predetermined layer, availability information indicating whether each of said plurality of processing units belonging to said lower layer is available or not,
   wherein said operation control unit belonging to said predetermined layer notifies said availability information to said operation control unit belonging to said upper layer, and
   said data distributor divides said one data supplied from said processing unit belonging to said upper layer through the control of said operation control unit belonging to said predetermined layer, and a plurality of data after dividing are selectively supplied to said plurality of processing units belonging to said lower layer.

2. The communication terminal apparatus according to claim 1, wherein said operation control unit belonging to said predetermined layer controls a distribution ratio of a plurality of data after said dividing supplied to one or more of the available processing units belonging to said lower layer by said data distributor.

3. The communication terminal apparatus according to claim 1,
   wherein said operation control unit belonging to said lower layer further notifies, to said operation control unit belonging to said predetermined layer, band information to indicate a band securable in communication using each of said plurality of processing units belonging to said lower layer, and route information to indicate a connection target connectable in the communication using each of said plurality of processing units belonging to said lower layer when said processing unit is available,
   wherein said operation unit belonging to said predetermined layer determines which processing unit belonging to said lower layer is connectable to a desired connection target based on the route information,
   wherein said processing unit belonging to said predetermined layer can selectively use said plurality of processing units belonging to said lower layer that is connectable to the desired connection target, through control of said operation control unit belonging to said predetermined layer, and
   wherein said operation control unit belonging to said predetermined layer notifies said band information and/or said route information in addition to said availability information to said operation control unit belonging to said upper layer.

4. The communication terminal apparatus according to claim 3, wherein said processing unit belonging to said predetermined layer comprises a data distributor for distributing a single supplied data and for outputting a plurality of data; and
   said data distributor divides said single data supplied from said processing unit belonging to said upper layer through control of said operation control unit belonging to said predetermined layer and supplies a plurality of data after dividing to said plurality of processing units belonging to said lower layer.

5. The communication terminal apparatus according to claim 4, wherein said operation control unit belonging to said predetermined layer refers to said band information and/or said route information, and controls distribution ratio of a plurality of data after said dividing to be supplied by said data distributor to one or more available processing units belonging to said lower layer.

6. The communication terminal apparatus according to claim 1, wherein said processing unit belonging to said predetermined layer comprises a data unifying section for unifying a plurality of supplied data and outputting one data; and
   said data unifying section unifies said plurality of data supplied from said plurality of processing units belonging to said lower layer and supplies one data after unification to said processing unit belonging to said upper layer.

7. The communication terminal apparatus according to claim 6, wherein said operation control unit belonging to said predetermined layer controls sequence of a plurality of data after dividing as outputted from said data distributor or controls sequence of a plurality of data from said lower layer unified by said data unifying section.

8. A communication control method in a communication terminal apparatus, comprising a plurality of layers hierarchically classified depending on different processing functions, wherein an operation control unit belonging to a predetermined layer among said plurality of layers selectively utilizes a plurality of processing units belonging to a lower layer than said predetermined layer and performs communication when said communication terminal apparatus carries out communication, the communication control method comprising:

a step in which an operation control unit belonging to said lower layer controls so that availability information is notified to said operation control unit belonging to said predetermined layer, said information indicating whether it is possible or not to utilize each of said plurality of processing units belonging to said lower layer;

a step in which said operation control unit belonging to said predetermined layer controls so that said availability information is notified to an operation control unit belonging to an upper layer of said predetermine layer; and a step in which a processing unit belonging to said predetermined layer divides said one data supplied from a processing unit belonging to said upper layer and controls so that a plurality of data after dividing is selectively supplied to said plurality of processing units belonging to said lower layer.

9. The communication control method according to claim 8, further comprising a step in which said operation control unit belonging to said predetermined layer controls a distribution ratio of a plurality of data after said dividing to be supplied to one or more available processing units belonging to said lower layer by said processing unit of said predetermined layer.

10. The communication control method according to claim 8, further comprising:

a step in which said operation control unit belonging to said lower layer further notifies, to said operation control unit belonging to said predetermined layer, band information to indicate a band securable in communication using each of said plurality of processing units belonging to said lower layer, and route information to indicate connection target connectable in the communication using each of said plurality of processing units belonging to said lower layer when said processing unit is available, a step in which said operation unit belonging to said predetermined layer determines which processing unit belonging to said lower layer is connectable to a desired connection target based on the route information, a step in which said processing unit belonging to said predetermined layer can selectively use said plurality of processing units belonging to said lower layer that is connectable to the desired connection target, through control of said operation control unit belonging to said predetermined layer, and a step in which said operation control unit belonging to said predetermined layer controls so that said band information and/or said route information is notified in addition to said availability information to said operation control unit belonging to said upper layer.

11. The communication control method according to claim 10, further comprising a step in which said processing unit belonging to said predetermined layer divides said one data supplied from the processing unit belonging to said upper layer and controls so that a plurality of data after said dividing is selectively supplied to said plurality of processing units belonging to said lower layer.

12. The communication control method according to claim 11, further comprising a step in which said operation control unit belonging to said predetermined layer refers to said band information and/or said route information and controls distribution ratio of a plurality of data after said dividing supplied to one or more available processing units belonging to said lower layer by said processing unit of said predetermined layer.

13. The communication control method according to claim 8, further comprising a step in which said processing unit belonging to said predetermined layer unifies said plurality of data supplied from said plurality of processing units belonging to said lower layer and controls so that one data after said dividing is supplied to said processing unit belonging to said upper layer.

14. The communication control method according to claim 13, further comprising a step in which said operation control unit belonging to said predetermined layer controls sequence of a plurality of data after said dividing as outputted from the processing unit belonging to said predetermined layer or controls sequence of a plurality of data from said lower layer unified by said processing unit belonging to said predetermined layer.

* * * * *